US012711112B2

(12) United States Patent
Dubey

(10) Patent No.: US 12,711,112 B2
(45) Date of Patent: Aug. 18, 2026

(54) DATABASE MIGRATION IN WIRELESS NETWORKS

(71) Applicant: RAKUTEN MOBILE, INC., Tokyo (JP)

(72) Inventor: Anshul Dubey, Tokyo (JP)

(73) Assignee: Rakuten Mobile, Inc., Tokyo (JP)

( * ) Notice: Subject to any disclaimer, the term of this patent is extended or adjusted under 35 U.S.C. 154(b) by 0 days.

(21) Appl. No.: 18/193,332

(22) Filed: Mar. 30, 2023

(65) Prior Publication Data

US 2024/0330253 A1 Oct. 3, 2024

(51) Int. Cl.
*G06F 16/21* (2019.01)
*G06F 16/27* (2019.01)

(52) U.S. Cl.
CPC .......... *G06F 16/214* (2019.01); *G06F 16/275* (2019.01)

(58) Field of Classification Search
None
See application file for complete search history.

(56) References Cited

U.S. PATENT DOCUMENTS 7,778,960 B1 * 8/2010 Chatterjee ............ G06F 16/214 707/802
10,897,502 B2 * 1/2021 Delbecq ................. H04L 67/34
11,853,273 B1 * 12/2023 Stephan ................ G06N 20/00
2004/0122954 A1 * 6/2004 Shaheen .......... H04W 36/0019 709/227
2011/0246419 A1 * 10/2011 Yancey .................. G06F 16/25 707/624
2016/0072713 A1 * 3/2016 Mhatre .............. H04L 67/1004 709/235
2018/0225288 A1 * 8/2018 Shivam .................. H04L 67/06
2020/0218732 A1 * 7/2020 Schaefer ................ G06F 16/27
2022/0222224 A1 * 7/2022 Pandey ..................... G06F 8/65
2022/0374411 A1 * 11/2022 Bailey .............. G06F 16/24532
2023/0246971 A1 * 8/2023 Sesha ................. H04L 47/2441
2024/0004960 A1 * 1/2024 Sevastyanov ....... G06F 18/2163

* cited by examiner

*Primary Examiner* — Kavita Stanley
*Assistant Examiner* — Cao D Vuong
(74) *Attorney, Agent, or Firm* — Sughrue Mion, PLLC

(57) ABSTRACT

Provided are a system, method, and device for database migration within a network. According to embodiments, the system can include a memory storage storing computer-executable instructions, and at least one processor communicatively coupled to the memory storage, wherein the at least one processor is configured to execute the instructions to implement a first database within a network, sync the first database with a second database within the network, and direct first network traffic from the second database to the first database.

20 Claims, 8 Drawing Sheets

DATABASE MIGRATION IN WIRELESS NETWORKS

TECHNICAL FIELD

Apparatuses and methods consistent with one or more example embodiments relate to database migration in wireless networks.

BACKGROUND

It is common for various enterprises, businesses, and network service providers to migrate to new database systems or change their network architecture, systems, and components. Currently, such migrations of databases or substantial changes to network systems require a maintenance window time frame, which is generally a period of time where access to the service provider's network is disabled for users, subscribers, and various types of network traffic. Such maintenance windows network down times are typically performed during off-peak hours, or if needed, during peak network traffic hours. The foregoing maintenance windows can significantly impact a network provider's subscriber base, which can negatively affect customer loyalty and satisfaction, costs/revenue, and key performance indicators (KPIs), among others. Further, in a live production or development network, it can be difficult to migrate from one database to another because there can be dynamic updates within the commercial traffic production environment. Therefore, the integrity of the new migrated database cannot be guaranteed during the migration, as data may have been updated on the prior database but not reflected on the new database during the migration process.

Hence, what is needed is a system, process, and apparatus that can allow for uninterrupted migration of databases within networks without the downtime, thereby allowing users to access the network during the migration process that is efficient, cost-effective, and prevents any service impacts (zero service impact) on the a network service operator's network.

SUMMARY

Example embodiments of the present disclosure provide a system, a method, and a device to automate and simply the process of migrating data between databases within a network without disruption to network traffic or network services, to enable seamless integration of new databases installed on a network, to allow data between databases to be synced in real-time or near-real-time, and to further reduce load on existing computing and network systems during the migration process, is cost-effective, and prevents any service impacts (zero service impact) to a network service operator's network, among other advantages.

According to some embodiments, a system is provided. The system that can include a memory storage storing computer-executable instructions, and at least one processor communicatively coupled to the memory storage, wherein the at least one processor is configured to execute the instructions to implement a first database within a network, sync the first database with a second database within the network, and direct first network traffic from the second database to the first database.

According to some embodiments, a method is provided. The method performed by at least one processor, can include implementing a first database within a network. The method can further include syncing the first database with a second database within the network, and directing first network traffic from the second database to the first database.

According to some embodiments, a non-transitory computer-readable recording medium is provided. The non-transitory computer-readable recording medium having recorded thereon instructions executable by at least one processor to cause the at least one processor to perform a method including implementing a first database within a network. The method can further include syncing the first database with a second database within the network, and directing first network traffic from the second database to the first database.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
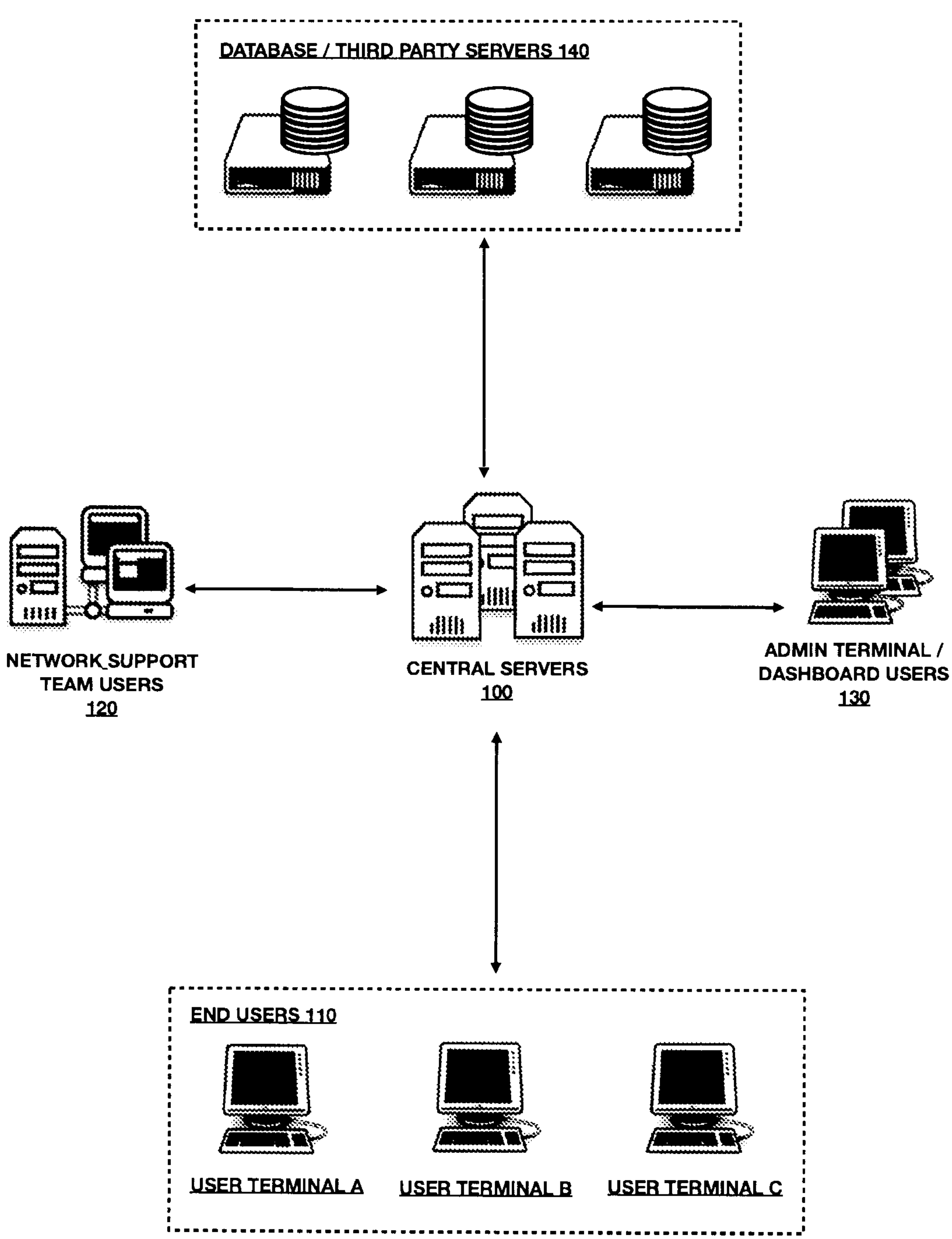
FIG. 1 illustrates a diagram of a general system architecture of the present disclosure described herein, according to one or more embodiments.

The following detailed description of example embodiments refers to the accompanying drawings. The same reference numbers in different drawings may identify the same or similar elements.

The foregoing disclosure provides illustrations and descriptions, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part).

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

In one implementation of the present disclosure described herein, a display page may include information residing in the computing device's memory, which may be transmitted from the computing device over a network to a database center and vice versa. The information may be stored in memory at each of the computing device, a data storage resided at the edge of the network, or on the servers at the database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Any discussion of a computing or mobile device may also apply to any type of networked device, including but not limited to mobile devices and phones such as cellular phones (e.g., any "smart phone"), a personal computer, server computer, or laptop computer; personal digital assistants (PDAs); a roaming device, such as a network-connected roaming device; a wireless device such as a wireless email device or other device capable of communicating wireless with a computer network; or any other type of network device that may communicate over a network and handle electronic transactions. Any discussion of any mobile device mentioned may also apply to other devices, such as devices including short-range ultra-high frequency (UHF) device, near-field communication (NFC), infrared (IR), and Wi-Fi functionality, among others.

Phrases and terms similar to "software", "application", "app", and "firmware" may include any non-transitory computer readable medium storing thereon a program, which when executed by a computer, causes the computer to perform a method, function, or control operation.

Phrases and terms similar to "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also include a network or data links which can be used to carry or store desired program code means in the form of computer-executable instructions or data structures and which can be accessed by a general purpose or special purpose computer.

Phrases and terms similar to "portal" or "terminal" may include an intranet page, internet page, locally residing software or application, mobile device graphical user interface, or digital presentation for a user. The portal may also be any graphical user interface for accessing various modules, components, features, options, and/or attributes of the present disclosure described herein. For example, the portal can be a web page accessed with a web browser, mobile device application, or any application or software residing on a computing device.

FIG. 1 illustrates a diagram of a general network architecture according to one or more embodiments. Referring to FIG. 1, end users 110, network support team users 120, and admin terminal/dashboard users 130 (collectively referred to herein as users 110, 120, and 130) can be in bi-directional communication over a secure network with central servers or application servers 100 according to one or more embodiments. In addition, users 110, 120, 130 may also be in direct bi-directional communication with each other via the network system of the present disclosure described herein according to one or more embodiments. Here, users 110 can be any type of customer, subscriber, network service provider agent, or vendor, among others, of a network or telecommunication service provider, such as users operating computing devices and user terminals A, B, and C. Each of users 110 can communicate with servers 100 via their respective terminals or portals. Users 120 can include application development members or support agents of the network service provider for developing, integrating, and monitoring databases, front end systems and services, network traffic, and provisioning traffic, among others, including assisting, scheduling, and modifying network events, and providing support services to end users 110. Admin terminal/dashboard users 130 may be any type of user with access privileges for accessing a dashboard or management portal of the present disclosure described herein, wherein the dashboard portal can provide various user tools, GUI information, maps, open/closed/pending support tickets, graphs, customer support options, network status and performance, and KPIs, among others. It is contemplated within the scope of the present disclosure described herein that any of users 110 and 120 may also access the admin terminal/dashboard 130 of the present disclosure described herein.

Still referring to FIG. 1, central servers 100 of the present disclosure described herein according to one or more embodiments can be in further bi-directional communication with database/third party servers 140, which may also include users. Here, servers 140 can include new databases that are targeted for migration within the present disclosure described herein. In addition, servers 140 can include servers and databases for captured, collected, or aggregated data, such as current, real-time, and past network related historical and KPI data which may be stored thereon and retrieved therefrom for network analysis, RCA, artificial intelligence (AI) processing, neural network models, machine learning, predictions, and simulations by servers 100. However, it is contemplated within the scope of the present disclosure described herein that the database migration system and method of the present disclosure described herein can include any type of general network architecture.

Still referring to FIG. 1, one or more of servers or terminals of elements 100-140 may include a personal computer (PC), a printed circuit board comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, one or more servers, terminals, and users 100-140 may include a set of components, such as a processor, a memory, a storage component, an input component, an output component, a communication interface, and a JSON UI rendering component. The set of components of the device may be communicatively coupled via a bus.

The bus may comprise one or more components that permit communication among the set of components of one or more of servers or terminals of elements 100-140. For example, the bus may be a communication bus, a cross-over bar, a network, or the like. The bus may be implemented using single or multiple (two or more) connections between the set of components of one or more of servers or terminals of elements 100-140. The disclosure is not limited in this regard.

One or more of servers or terminals of elements 100-140 may comprise one or more processors. The one or more processors may be implemented in hardware, firmware, and/or a combination of hardware and software. For example, the one or more processors may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The one or more processors also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The one or more processors may control overall operation of one or more of servers or terminals of elements 100-140 and/or of the set of components of one or more of servers or terminals of elements 100-140 (e.g., memory, storage component, input component, output component, communication interface, rendering component).

One or more of servers or terminals of elements 100-140 may further comprise memory. In some embodiments, the memory may comprise a random access memory (RAM), a read only memory (ROM), an electrically erasable programmable ROM (EEPROM), a flash memory, a magnetic memory, an optical memory, and/or another type of dynamic or static storage device. The memory may store information and/or instructions for use (e.g., execution) by the processor.

A storage component of one or more of servers or terminals of elements 100-140 may store information and/or computer-readable instructions and/or code related to the operation and use of one or more of servers or terminals of elements 100-140. For example, the storage component may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

One or more of servers or terminals of elements 100-140 may further comprise an input component. The input component may include one or more components that permit one or more of servers and terminals 100-140 to receive information, such as via user input (e.g., a touch screen, a keyboard, a keypad, a mouse, a stylus, a button, a switch, a microphone, a camera, and the like). Alternatively or additionally, the input component may include a sensor for sensing information (e.g., a global positioning system (GPS) component, an accelerometer, a gyroscope, an actuator, and the like).

An output component any one or more of servers or terminals of elements 100-140 may include one or more components that may provide output information from the device 100 (e.g., a display, a liquid crystal display (LCD), light-emitting diodes (LEDs), organic light emitting diodes (OLEDs), a haptic feedback device, a speaker, and the like).

One or more of servers or terminals of elements 100-140 may further comprise a communication interface. The communication interface may include a receiver component, a transmitter component, and/or a transceiver component. The communication interface may enable one or more of servers or terminals of elements 100-140 to establish connections and/or transfer communications with other devices (e.g., a server, another device). The communications may be enabled via a wired connection, a wireless connection, or a combination of wired and wireless connections. The communication interface may permit one or more of servers or terminals of elements 100-140 to receive information from another device and/or provide information to another device. In some embodiments, the communication interface may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, sixth generation (6G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface may provide for communications with another device via a device-to-device (D2D) communication link, such as FlashLinQ, WiMedia, Bluetooth, ZigBee, Wi-Fi, LTE, 5G, and the like. In other embodiments, the communication interface may include an Ethernet interface, an optical interface, a coaxial interface, an infrared interface, a radio frequency (RF) interface, or the like. It is understood that other embodiments are not limited thereto, and may be implemented in a variety of different architectures (e.g., bare metal architecture, any cloud-based architecture or deployment architecture such as Kubernetes, Docker, OpenStack, etc.).

Figure 2:
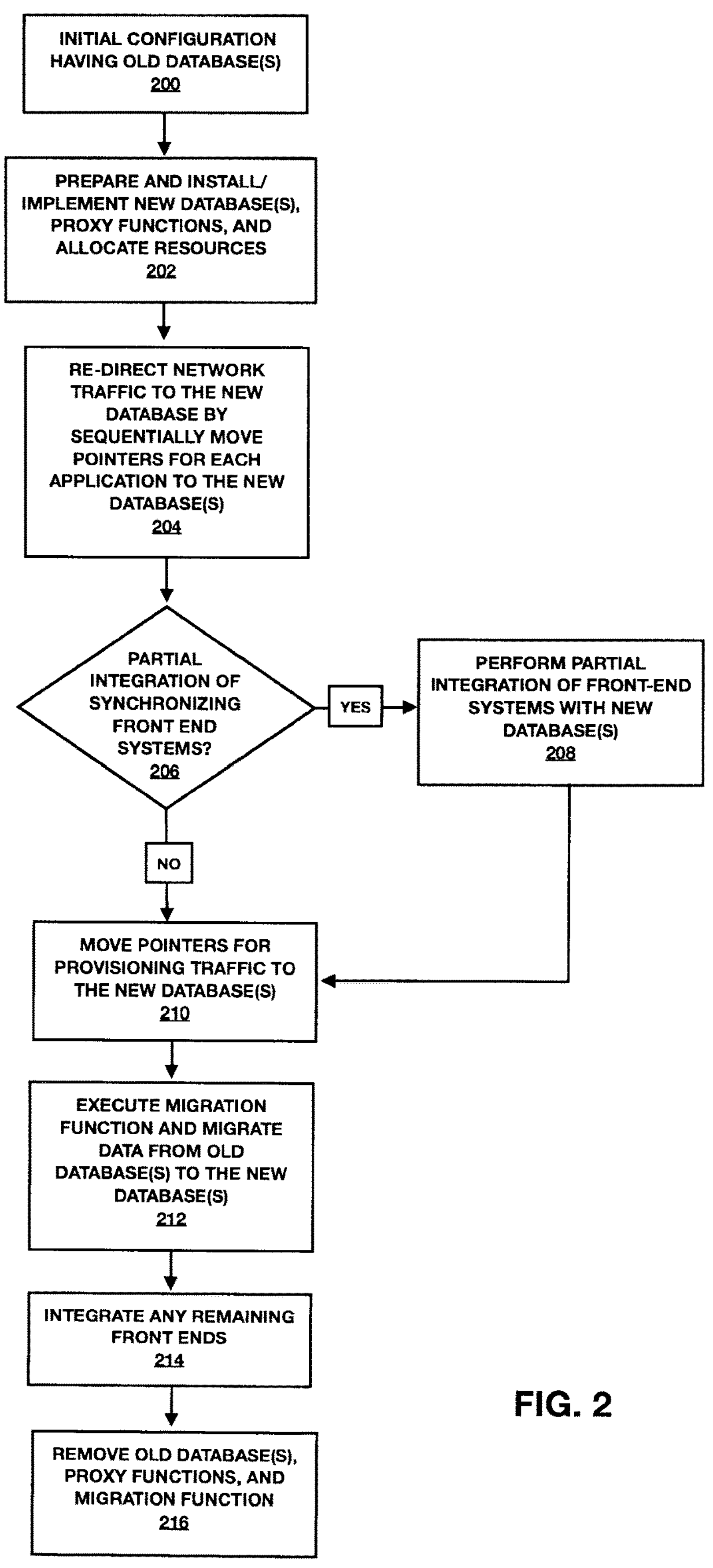
FIG. 2 illustrates a process flow diagram for the database migration system and method of the present disclosure described herein, according to one or more embodiments.
Figure 3:
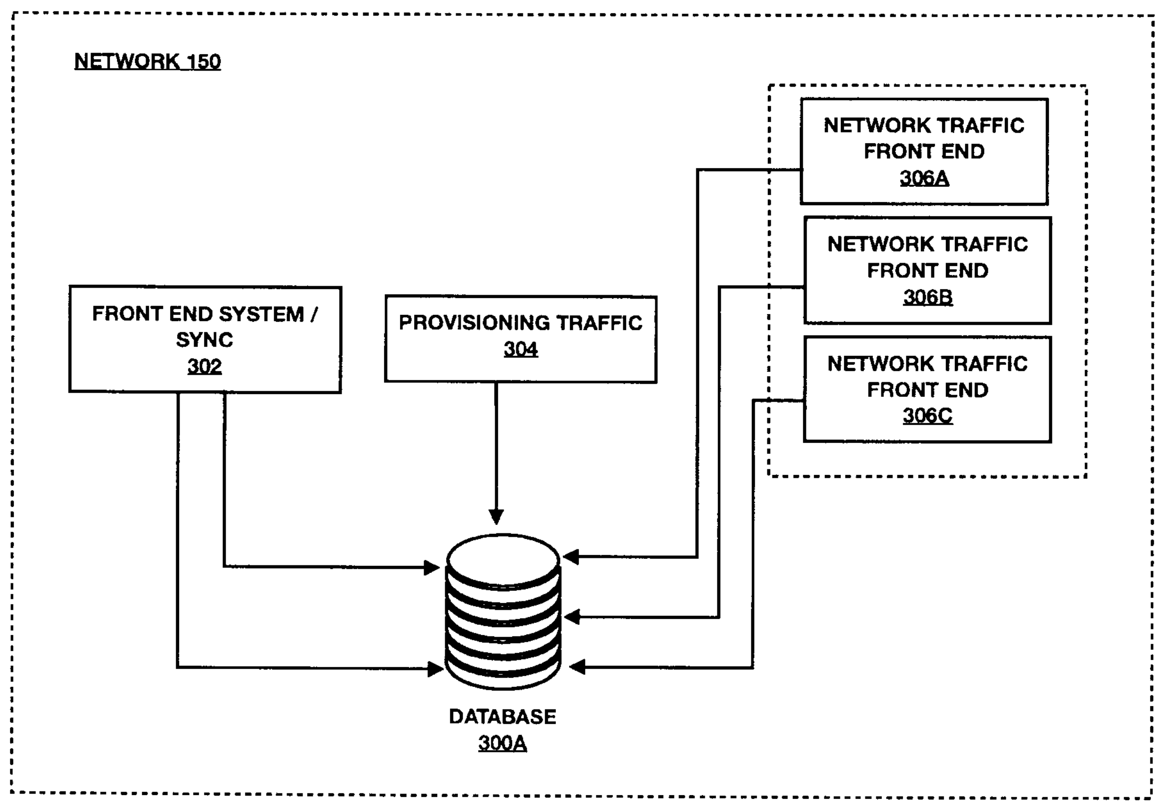
FIG. 3 illustrates a simplified diagram of an exemplary network architecture shown in an initial configuration prior to migration to a new database for the present disclosure described herein, according to one or more embodiments.

FIG. 2 illustrates a process flow for the database migration system, method, and device of the present disclosure described herein according to one or more exemplary embodiments. Here, any discussion of FIG. 2 may also refer to and be applicable with respect to any of FIGS. 3-8. As shown in FIG. 2, at step 200, a service provider's network may include a default configuration having an old/prior database or a database from which data is to be migrated therefrom. An example of such an initial configuration of a network architecture 150 is shown in FIG. 3. As shown in FIG. 3, network 150 may include database 300A (old/prior database or a database from which data is to be migrated therefrom). Database 300A can be in communication with any one or more front-end system, modules, services, or functions 302 of the network, such as data syncing functions. In addition, database 300A can be accessed by provisioning traffic 304 from various nodes, which can include network traffic of users, systems, or functions that are creating and writing new database entries onto database 300A. Further, database 300A can be accessed by multiple streams of network traffic and application traffic from various nodes, such as network traffic front end 306A, 306B, and 306C for exemplary purposes. Further, the system of the present disclosure described herein can distinguish between incoming provision traffic 304 and network traffic 306A-306C because provisioning traffic and network traffic each come from different front end systems. As an example, network traffic front end 306A-306C may be coming via a Home Subscriber Service (HSS), Home Location Register (HLR), Equipment Identity Register (EIR), or Mobile Number Portability (MNP). In contrast, for example, provisioning traffic 304 may be coming via a Provisioning Gateway. Here, it is contemplated within the scope of the present disclosure described herein that each of traffic 306A, 306B, and 306C can be from various applications, users, sources, regions, or nodes, including high, medium, or low priority traffic. In addition, the database migration system, method, and device of the present disclosure described herein can be performed on any type of physical or virtual platform, such as a cloud computing platform having virtual servers and databases. In addition, network traffic front end 306A-306C can also pass through front end system/sync 302 either directly or via database 300A. Further, it is also contemplated within the scope of the present disclosure described herein that front end catering network traffic can also perform modifying operations depending on a network scenario, and provisioning front end traffic (or gateway) can be controlled by an external user/admin and can further perform read/write operations, among others.

Figure 4:
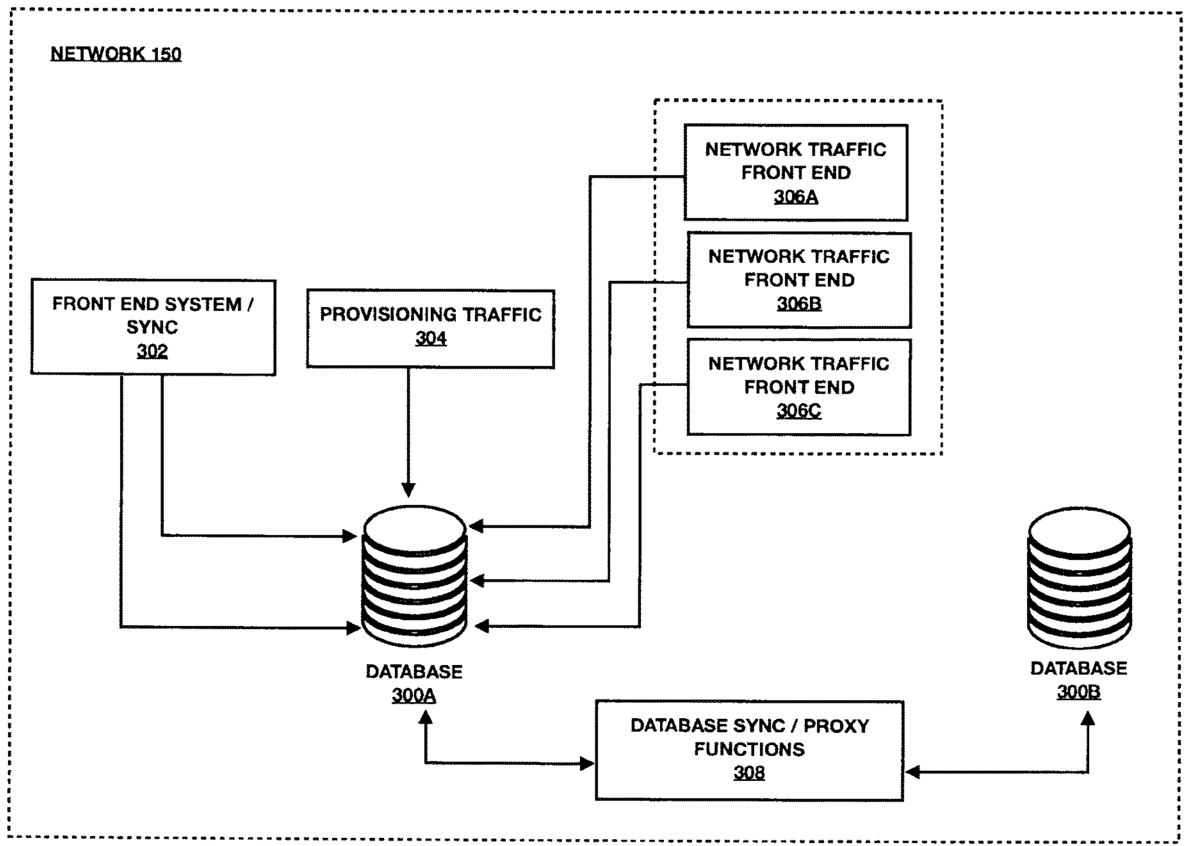
FIG. 4 illustrates another simplified diagram of the exemplary network architecture shown in a transitional configuration with integration of a new database for the present disclosure described herein, according to one or more embodiments.
Figure 5:
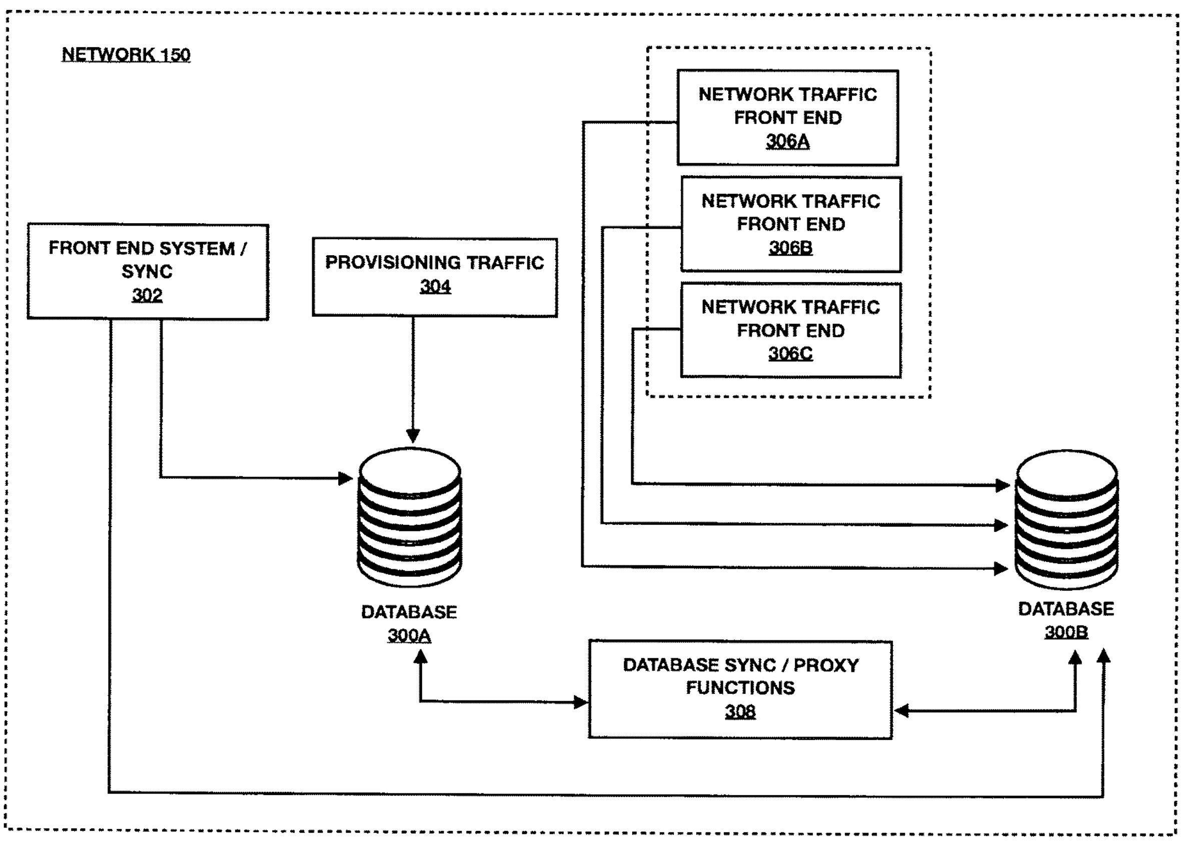
FIG. 5 illustrates another simplified diagram of the exemplary network architecture shown in in a transitional configuration with a re-routing of network traffic and partial integration of front-end systems to the new database for the present disclosure described herein, according to one or more embodiments.

Referring back to FIG. 2, at step 202, the system can prepare, install, and implement one or more new databases and proxy functions on the service provider's network, and further allocate network resources and components as needed. For example, as shown in FIG. 4, a new database 300B is installed or implemented on network 150. Further, new database 300B and database 300A can be in bi-directional communication with each other during this time via a database syncing operation/module and proxy function module 308. In particular, prior to proceeding to step 204, a syncing operation should be performed between the new database and prior database. Referring back to FIG. 2, at step 204, the system can re-direct or re-route network traffic to the new database. For example, as shown in FIG. 5, the system can sequentially (or via a pre-defined order) re-route or move the pointers for each of network traffic front end 306A-306C from database 300A to database 300B, via any type of methods, systems, or physical or virtual network switches and routers, among others. The foregoing sequential process ensures a smooth re-direction of network traffic to the new database, which can help to distribute load evenly on the new database and within the network, among other advantages.

Still referring to FIG. 2 and FIG. 5, alternatively, each of network traffic front end 306A-306C can be re-directed in any desired order based on priority, urgency, or any defined one or more criteria, such as network traffic of high priority being re-directed first (e.g., network traffic front end 306A), network traffic of medium priority being re-directed second (e.g., network traffic 306B), and network traffic of low priority being re-directed last (e.g., network traffic front end 306B), or in any other order as needed. Through testing, it was found that in order to obtain for optimal results, it was critical that network and application traffic (or network traffic front end 306A-306B) is moved or re-directed to the new database (or database 300B) prior to re-directing provisioning traffic (or provisioning traffic 304) to the new database in order to ensure minimal or no impact on network performance. Additional reasons for following the specific foregoing order are that the re-directing of provisioning traffic should be performed on the latest version of a subscriber's profile in order to ensure minimal or no impact to the customer at the service level.

Referring back to FIG. 2, at step 206, the system may also determine if certain synchronizing front-end systems, functions, modules, or services need partial integration with the new database, and if yes, then the system can proceed to step 208, and if no, then the process can proceed to step 210. In particular, certain synchronizing front-end systems, such as data syncing functions and operations, may need to simultaneously be in communication with the old database while also being integrated and in communication with the new database. The foregoing helps to ensure that if data is being created or modified on the old database, then such updated data is synced with the new database in real-time or near real-time. Here, a front end system is generally catering to traffic from the network while a synchronizing front end system can be one which caters traffic from a database directly and responds accordingly. Specifically, a synchronizing front end can be a front end for one or more databases connected with other network functions internally and can further performs synchronization inside the one or more databases. For example, this can include user profile synchronizations performed between associated parameters or 3G and 4G networks, or any specific application network. In addition, a sync function can be a synching process that is performed between databases in order to sync them with each other. At step 208, the system can perform partial integration of the front-end systems with the new database. For example, as shown in FIG. 5, front end system 302 has one node/end-point in communication with database 300A and another node/end-point in communication database 300B, such that any data or entries created or modified on either database is synced in real-time or near real-time with each corresponding database. Here, partial integration of specific front end or sync front end is performed until the migrations process is complete. In operation, a portion (or partial) of subscribers will be in the prior database 300A until a provisioning pointer is moved to the new database, then the subscribers will be directed to the new database 300B. Here, sync server or sync function 308 should maintain communication with both databases 300A and 300B until migration is completed else; otherwise, there can be a potential service impact.

Figure 6:
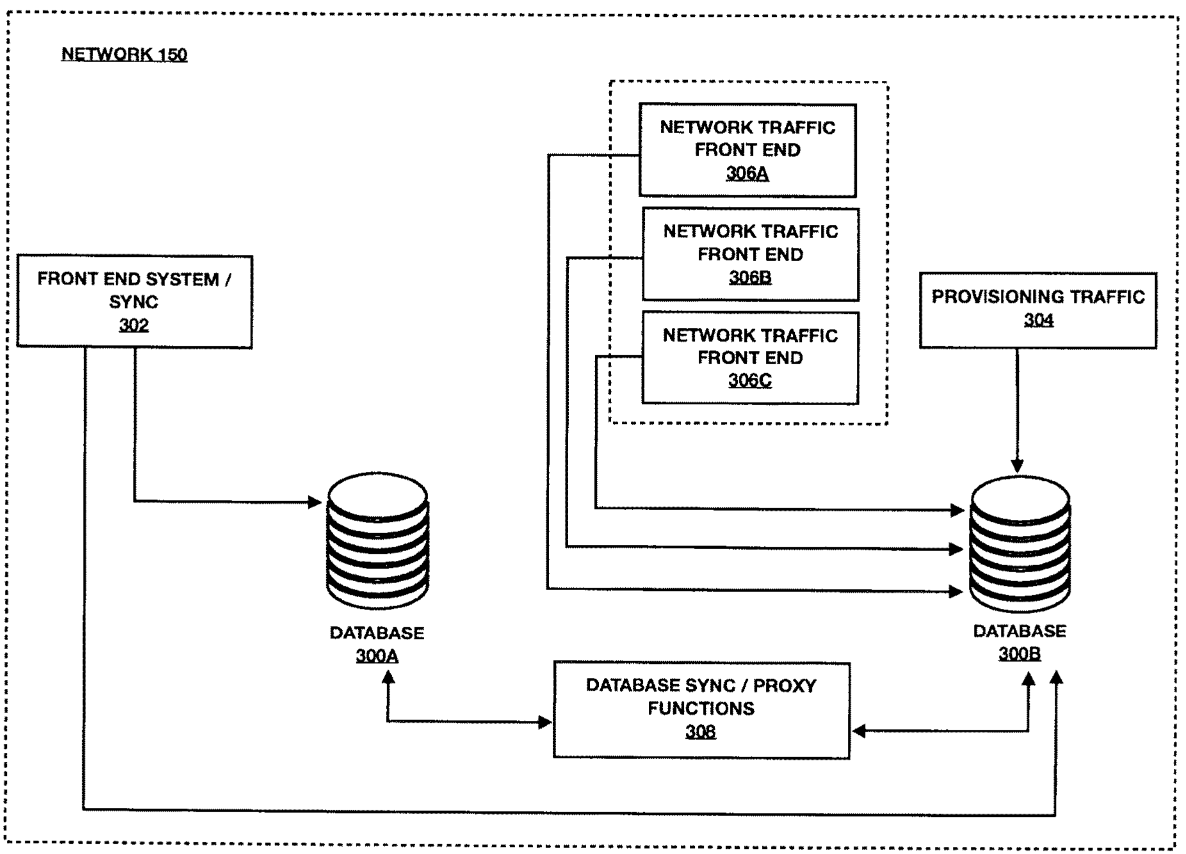
FIG. 6 illustrates another simplified diagram of the exemplary network architecture shown in a transitional configuration with a re-routing of provisioning traffic to the new database for the present disclosure described herein, according to one or more embodiments.
Figure 7:
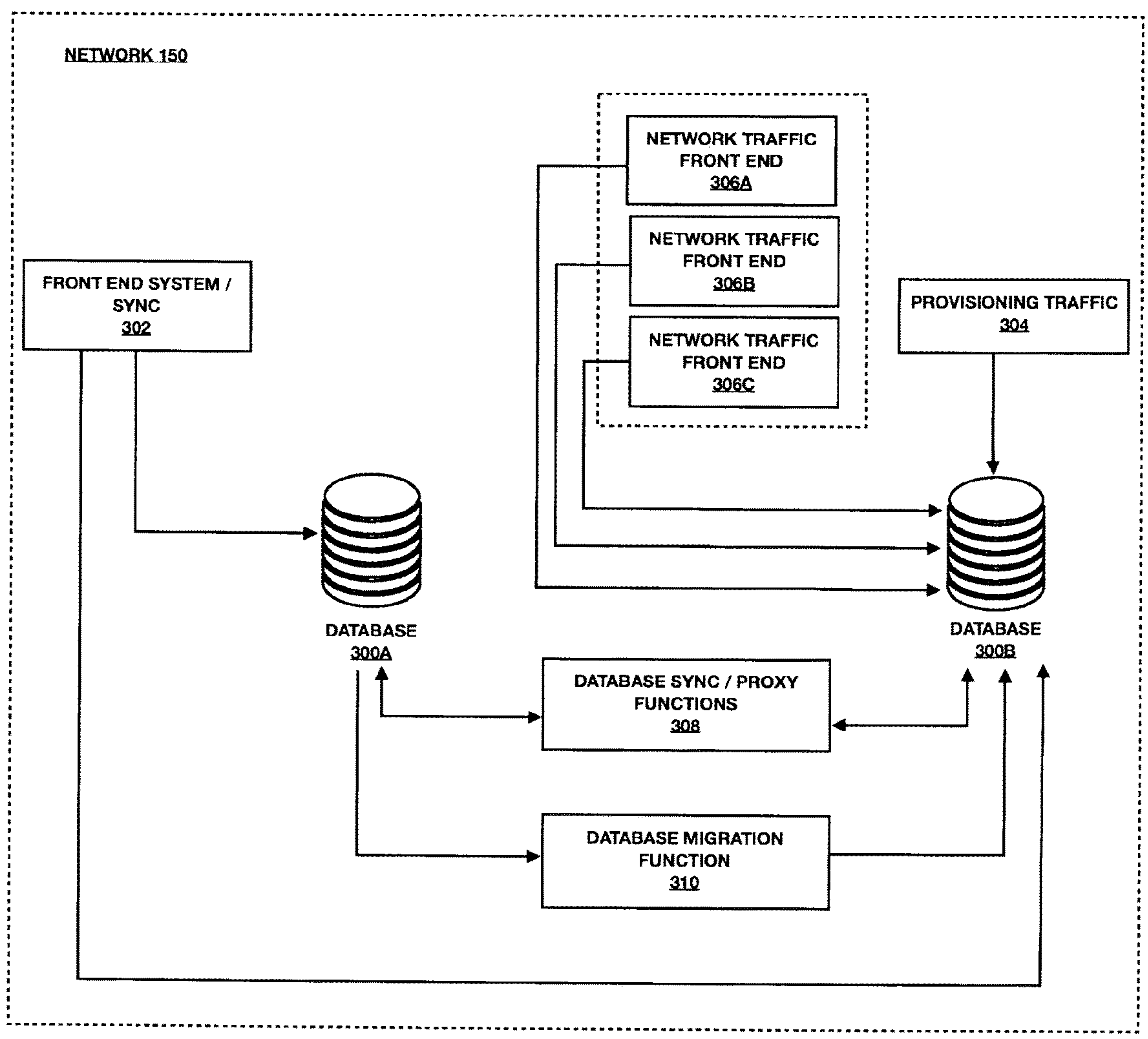
FIG. 7 illustrates another simplified diagram of the exemplary network architecture shown in a transitional configuration with a database migration function and copying of data to the new database for the present disclosure described herein, according to one or more embodiments.
Figure 8:
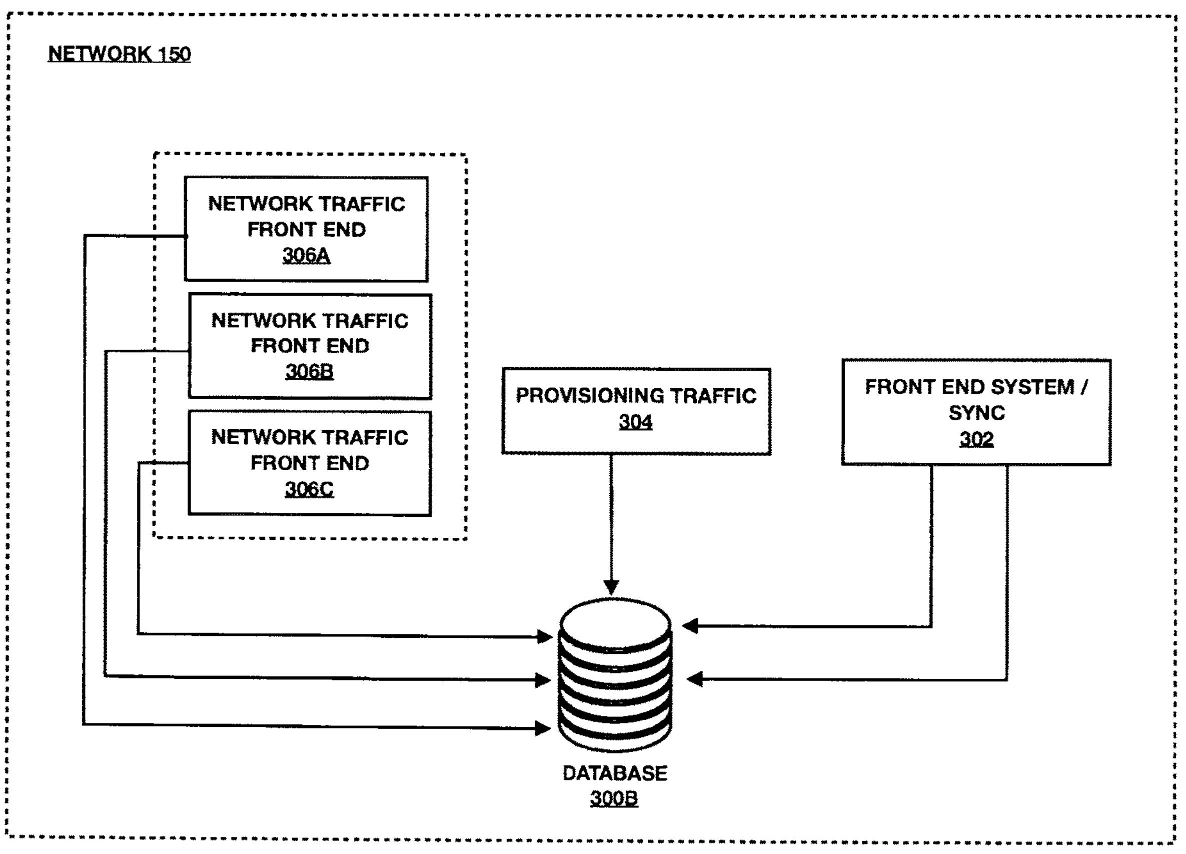
FIG. 8 illustrates another simplified diagram of the exemplary network architecture shown with the front end systems re-routed to the new database and with the prior database removed from the network, for the present disclosure described herein, according to one or more embodiments.

Referring back to FIG. 2, at step 210, the system can re-direct or move the pointers for the provisioning traffic to the new database. For example, as shown in FIG. 6, after network/application traffic front end 306A-306B has been re-directed to database 300B, the provisioning traffic 304 is then re-directed to database 300B via any methods, systems, or physical or virtual network switches and routers, among others. Referring back to FIG. 2, at step 212, after all traffic, including network/application traffic and provisioning traffic, have been re-directed to the new database, then the system can execute one or more migration functions in order to move, transfer, copy, and migrate data from the old database to the new database. For example, as shown in FIG. 7, a database migration function or module 310 is implemented between database 300A and 300B in order to execute the transfer and migration of all desired data from database 300A to 300B. Referring back to FIG. 2, at step 214, once data has been migrated to the new database, then any remaining front-end system node or end-points that were partially in communication with the old database are then removed from the old database and further integrated and placed in communication with the new database. Finally, at step 216, once data migration is complete and all remaining front-end systems have been integrated with the new database, then the old database may be removed from the network, including any proxy/sync functions or modules and migration functions or modules. For example, a completed migration is shown in FIG. 8, whereby all of the end-points of front end system are shown to be in communication with database 300B, all the network traffic front end 306A-306C directed to database 300B, and all provisioning traffic directed to database 300B. Further, the prior database 300A, database sync/proxy function/module 308, and database migration function/module 310 removed from network 150.

As discussed with respect to FIGS. 2-8 with respect to one or more embodiments, the foregoing methods, systems, and apparatus of the present disclosure described herein provide a seamless transition of migrating data to new databases without the need for a maintenance window or down time of network systems, and further allows for zero service impact to the operator's network. In addition, the foregoing ensures that any data that was updated on prior databases during the transition or migration period will be updated or synced in real-time or near real-time with the new databases. Other technical improvements of the present disclosure described herein can include continuous operation of network components and access to network systems by users, minimizing or eliminating any additional load on computing systems and network resources due to network disruptions, routing traffic to the new database in a pre-defined or sequential order that does not overload the new database or existing systems, eliminates the need for an alternative or third-party network system, nodes, or service providers to accept re-directed network traffic thereby affecting other users of that service providers with respect to network speed, etc., and can be further implemented in a virtual or cloud computing environment to minimize the use of physical computing and network resources, among other advantages and improvements.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, microservice(s), segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Various further respective aspects and features of embodiments of the present disclosure may be defined by the following items:

Item [1]: A system including a memory storage storing computer-executable instructions; and at least one processor communicatively coupled to the memory storage, wherein the at least one processor can be configured to execute the instructions to implement a first database within a network; sync the first database with a second database within the network; and direct first network traffic from the second database to the first database.

Item [2]: The system of item [1], wherein the at least one processor may be configured to execute the instructions to integrate, at least partially, a front-end system with the first database such that the front-end system is in communication with both the first database and the second database.

Item [3]: The system of item [2], wherein the at least one processor may be configured to execute the instructions to upon directing the first network traffic from the second database to the first database, direct a second network traffic from the second database to the first database.

Item [4]: The system of items [2]-[3], wherein the at least one processor may be configured to execute the instructions to upon directing the second network traffic from the second database to the first database, migrate data from the second database to the first database.

Item [5]: The system of items [2]-[4], wherein at least one processor may be configured to execute the instructions to upon migrating data from the second database to the first database, remove the integration of the front-end system with the second database.

Item [6]: The system items [2]-[5], wherein the at least one processor may be configured to execute the instructions to upon removing the integration of the front-end system with the second database, remove the second database from the network.

Item [7]: The system of item [1], wherein the first network traffic may include user or application traffic at least partially configured to read, edit, or modify data on the first database or second database.

Item [8]: The system of item [7], wherein the second network traffic may include provisioning traffic configured to add, remove, edit, or modify data on the first database or second database.

Item [9]: The system of item [1], wherein the first network traffic may further include a plurality of sub-traffic.

Item [10]: The system of item [9], wherein the at least one processor may be configured to execute the instructions to direct, in a sequential order, each of the plurality of sub-traffic to the first database based on one or more criteria.

Item [11]: A method, performed by at least one processor. The method can include implementing a first database within a network; syncing the first database with a second database within the network; and directing first network traffic from the second database to the first database.

Item [12]: The method of item [11], may further include integrating, at least partially, a front-end system with the first database such that the front-end system is in communication with both the first database and the second database.

Item [13]: The method of item [12], may further include upon directing the first network traffic from the second database to the first database, directing a second network traffic from the second database to the first database.

Item [14]: The method of items [12]-[13], may further include upon directing the second network traffic from the second database to the first database, migrating data from the second database to the first database.

Item [15]: The method of items [12]-[14], may further include upon migrating data from the second database to the first database, removing the integration of the front-end system with the second database.

Item [16]: The method of items [12]-[15], may further include upon removing the integration of the front-end system with the second database, removing the second database from the network.

Item [17]: The method of item [11], wherein the first network traffic may include user or application traffic at least partially configured to read, edit, or modify data on the first database or second database.

Item [18]: The method of item [11], wherein the second network traffic may include provisioning traffic configured to add, remove, edit, or modify data on the first database or second database.

Item [19]: The method of claim [11], wherein the first network traffic may further include a plurality of sub-traffic, and directing, in a sequential order, each of the plurality of sub-traffic to the first database based on one or more criteria.

Item [20]: A non-transitory computer-readable recording medium having recorded thereon instructions executable by at least one processor to cause the at least one processor to perform a method that can include implementing a first database within a network; syncing the first database with a second database within the network; and directing first network traffic from the second database to the first database.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A system comprising:

a memory storage storing computer-executable instructions; and at least one processor communicatively coupled to the memory storage, wherein the at least one processor is configured to execute the instructions to:

implement a first database within a network;

sync the first database with a second database within the network;

direct a first network traffic from the second database to the first database; and in response to determining that the first network traffic has been directed from the second database to the first database, direct a second network traffic from the second database to the first database, wherein the first network traffic comprises a network traffic from frontend systems, wherein the second network traffic comprises a network traffic from a Provisioning Gateway, and wherein directing the first network traffic to the first database is performed before directing the second network traffic to the first database based on determining the first network traffic as being from the frontend systems and the second network traffic as being from the Provisioning Gateway.

2. The system of claim 1, wherein the at least one processor is configured to execute the instructions to:

integrate, at least partially, a front-end system with the first database such that the front-end system is in communication with both the first database and the second database.

3. The system of claim 2, wherein the at least one processor is configured to execute the instructions to:

in response to determining that the second network traffic has been directed from the second database to the first database, migrate data from the second database to the first database.

4. The system of claim 3, wherein the at least one processor is configured to execute the instructions to:

upon migrating data from the second database to the first database, remove the integration of the front-end system with the second database.

5. The system of claim 4, wherein the at least one processor is configured to execute the instructions to:

upon removing the integration of the front-end system with the second database, remove the second database from the network.

6. The system of claim 1, wherein the first network traffic is comprised of user or application traffic at least partially configured to read, edit, or modify data on the first database or second database.

7. The system of claim 1, wherein the second network traffic is comprised of provisioning traffic configured to add, remove, edit, or modify data on the first database or second database.

8. The system of claim 1, wherein the first network traffic is further comprised of a plurality of sub-traffic.

9. The system of claim 8, wherein the at least one processor is configured to execute the instructions to:

direct, in a sequential order, each of the plurality of sub-traffic to the first database based on one or more criteria.

10. The system of claim 1, wherein the first network traffic comprises a network traffic from a Home Subscriber Service (HSS), Home Location Register (HLR), Equipment Identity Register (EIR), or Mobile Number Portability (MNP).

11. The system of claim 1, wherein the at least one processor is configured to execute the instructions to:

migrate data from the second database to the first database prior to directing the second network traffic from the second database to the first database.

12. A method, performed by at least one processor, comprising:

implementing a first database within a network;

syncing the first database with a second database within the network;

directing a first network traffic from the second database to the first database; and in response to determining that the first network traffic has been directed from the second database to the first database, directing a second network traffic from the second database to the first database, wherein the first network traffic comprises a network traffic from frontend systems, wherein the second network traffic comprises a network traffic from a Provisioning Gateway, and wherein directing the first network traffic to the first database is performed before directing the second network traffic to the first database based on determining the first network traffic as being from the frontend systems and the second network traffic as being from the Provisioning Gateway.

13. The method of claim 12, further comprising:

integrating, at least partially, a front-end system with the first database such that the front-end system is in communication with both the first database and the second database.

14. The method of claim 13, further comprising:

in response to determining that the second network traffic has been directed from the second database to the first database, migrating data from the second database to the first database.

15. The method of claim 14, further comprising:

upon migrating data from the second database to the first database, removing the integration of the front-end system with the second database.

16. The method of claim 15, further comprising:

upon removing the integration of the front-end system with the second database, removing the second database from the network.

17. The method of claim 12, wherein the first network traffic is comprised of user or application traffic at least partially configured to read, edit, or modify data on the first database or second database.

18. The method of claim 12, wherein the second network traffic is comprised of provisioning traffic configured to add, remove, edit, or modify data on the first database or second database.

19. The method of claim 12, wherein the first network traffic is further comprised of a plurality of sub-traffic, and directing, in a sequential order, each of the plurality of sub-traffic to the first database based on one or more criteria.

20. A non-transitory computer-readable recording medium having recorded thereon instructions executable by at least one processor to cause the at least one processor to perform a method comprising:

implementing a first database within a network;

syncing the first database with a second database within the network;

directing a first network traffic from the second database to the first database; and in response to determining that the first network traffic has been directed from the second database to the first database, directing a second network traffic from the second database to the first database, wherein the first network traffic comprises a network traffic from frontend systems, wherein the second network traffic comprises a network traffic from a Provisioning Gateway, and wherein directing the first network traffic to the first database is performed before directing the second network traffic to the first database based on determining the first network traffic as being from the frontend systems and the second network traffic as being from the Provisioning Gateway.

* * * * *